United States Patent
Nguyen et al.

(10) Patent No.: US 8,551,925 B2
(45) Date of Patent: Oct. 8, 2013

(54) IMIDAZOLINE-BASED HETEROCYCLIC FOAMERS FOR DOWNHOLE INJECTION

(75) Inventors: Duy T. Nguyen, Houston, TX (US); G. Richard Meyer, Missouri City, TX (US)

(73) Assignee: Nalco Company, Naperville, IL (US)

( * ) Notice: Subject to any disclaimer, the term of this patent is extended or adjusted under 35 U.S.C. 154(b) by 450 days.

(21) Appl. No.: 11/940,777

(22) Filed: Nov. 15, 2007

(65) Prior Publication Data

US 2009/0131283 A1    May 21, 2009

(51) Int. Cl.
| C23F 11/14 | (2006.01) |
| C09K 8/60 | (2006.01) |
| E21B 43/26 | (2006.01) |
| E21B 43/00 | (2006.01) |

(52) U.S. Cl.
USPC ......... 507/243; 507/240; 166/308.6; 166/309

(58) Field of Classification Search
USPC ............... 507/240, 243; 166/308.6, 372, 309
See application file for complete search history.

(56) References Cited

U.S. PATENT DOCUMENTS

| 4,269,730 A | 5/1981 | Wechsler et al. |
| 4,347,154 A | 8/1982 | Simmons |
| 4,705,893 A | 11/1987 | Sotoya et al. |
| 4,796,702 A * | 1/1989 | Scherubel ............... 166/309 |
| 5,203,411 A | 4/1993 | Dawe et al. |
| 5,322,640 A * | 6/1994 | Byrne et al. ............. 252/389.22 |
| 5,789,352 A | 8/1998 | Carpenter et al. |
| 7,040,419 B2 | 5/2006 | Chatterji et al. |
| 7,122,509 B2 | 10/2006 | Sanner et al. |
| 2005/0124500 A1* | 6/2005 | Chen et al. ............. 507/200 |
| 2005/0137114 A1 | 6/2005 | Gatlin et al. |
| 2006/0090895 A1* | 5/2006 | Chatterji et al. ............. 166/278 |
| 2006/0128990 A1 | 6/2006 | Davis et al. |
| 2007/0079963 A1 | 4/2007 | Yang et al. |
| 2008/0217017 A1* | 9/2008 | Brown et al. .............. 166/311 |

FOREIGN PATENT DOCUMENTS

| GB | 1043502 | * 9/1966 |
| WO | WO0071241 | 11/2000 |
| WO | WO02092963 | 11/2002 |

* cited by examiner

*Primary Examiner* — Aiqun Li

(74) *Attorney, Agent, or Firm* — Edward O. Yonter; Andrew D. Sorensen

(57) ABSTRACT

Disclosed are imidazoline-based foamers and corrosion inhibitors for treatment of oil and gas wells for enhanced production. The invention also includes methods of foaming a fluid by introducing the disclosed foamers to oil and gas wells.

7 Claims, No Drawings

IMIDAZOLINE-BASED HETEROCYCLIC FOAMERS FOR DOWNHOLE INJECTION

TECHNICAL FIELD

This invention relates generally to novel foamer compositions for treatment of oil and gas wells to enhance production. More specifically, the invention relates to imidazoline-based foamer compositions. The invention has particular relevance to quaternized imidazoline-based foamer compositions that also inhibit corrosion in oil and gas wells.

BACKGROUND

In natural gas wells, gas production decreases due to the decline of reservoir pressure. The cause of this loss of gas production is liquid loading that occurs when water and condensate enter the bottom of the well. Foaming agents are frequently used to aid in the unloading of water and condensate accumulated in the wellbore, thereby increasing production from a loaded well. Foaming agents can be applied either by batch treatments or continuous applications via injecting down a capillary string or via the casing/tubing annulus. Foamers function by reducing the surface tension and fluid density in the wellbore.

Foamers are also used in conjunction with a lift gas to enhance oil recovery from oil wells. U.S. Pat. App. No. 2006-0128990 teaches a method of treating a gas well comprising a chloride-free amphoteric surfactant. U.S. Pat. No. 7,122,509 provides a method of preparing a foamer composition having an anionic surfactant and a neutralizing amine. In U.S. Pat. App. No. 2005-0137114, an aqueous foaming composition comprising at least one anionic surfactant, cationic surfactant, and at least one zwitterionic compound is disclosed. PCT Pat. App. Nos. WO 02-092963 and 2007-0079963 disclose a method for recovering oil from a gas-lifted oil well using a lift gas and a foaming surfactant that consists of nonionic surfactants, anionic surfactants, betaines, and siloxanes.

While such foamers represent a significant contribution to the art of unloading fluids in oil and gas wells, there still remains a need for improved foamers and methods of using improved foamers. It is thus an objective of this invention to provide a cost-effective foamer for unloading oil, water, or mixtures thereof from oil and/or gas wells. Such improved foamers would also ideally possess anti-corrosive properties.

SUMMARY

In an aspect, the invention provides a foaming composition including an effective amount of a heterocyclic quaternized foaming agent having a general formula shown as Structure I below. In an embodiment, the composition further includes a synergistically effective amount of one or more betaine surfactants, explained in more detail below. Preferably, the composition includes an aqueous and/or organic solvent.

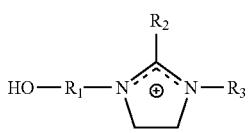

(I)

In preferred embodiments, $R_1$ and $R_2$ are independently selected from substituted or unsubstituted branched, chain, or ring alkyl or alkenyl having from 1 to about 25 carbon atoms in its main chain; and $R_3$ is selected from straight-chain, branched, or ring saturated or unsaturated aliphatic chains including from about 2 to about 20 carbon atoms in its main chain and having one or more acidic functional groups.

In a further aspect of the invention, a method of foaming a fluid is disclosed. The method includes adding an effective foam-forming amount of a foaming composition including the compound of Structure I above, either as batch addition or continuously. In a preferred embodiment, the foaming composition of the method includes a synergistically effective amount of a betaine surfactant, described in more detail below.

In another aspect, the invention includes a method of foaming a fluid by adding to the fluid an effective amount of a salt of a heterocyclic quaternized foaming agent, as shown in Structure II below.

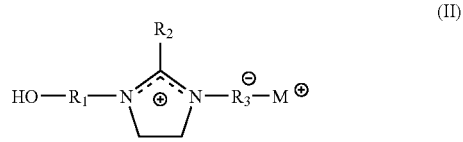

(II)

In preferred embodiments, $R_1$, $R_2$, and $R_3$ are as defined herein and M is any counterion. Representative counterions include monovalent cations, such as sodium, potassium, other suitable cations, and neutralizing amines. Neutralizing amines may be a primary amine, a secondary amine, a tertiary amine, an ethoxylated amine, an amidoamine, ammonia, triethanolamine, the like, and combinations thereof.

It is an advantage of the invention to provide novel foaming agents for downhole injection in oil and gas wells.

It is another advantage of the invention to provide dual-purpose foaming agents having both foaming properties and anti-corrosive properties.

It is a further advantage of the invention to provide an efficient method of recovering oil from a gas-lifted oil well penetrating a subterranean oil-bearing formation.

It is yet another advantage of the invention to provide a chloride-free foamer efficient at removing fluids from oil and gas wells.

A further advantage of the invention is to provide an efficient method to remove hydrocarbon fluids from a gas-producing well.

Additional features and advantages are described herein, and will be apparent from, the following Detailed Description and Examples.

DETAILED DESCRIPTION

"Alkenyl" means a monovalent group derived from a straight, branched, or cyclic hydrocarbon containing at least one carbon-carbon double bond by the removal of a single hydrogen atom from each of two adjacent carbon atoms of an alkyl group. Representative alkenyl groups include, for example, ethenyl, propenyl, butenyl, 1-methyl-2-buten-1-yl, and the like.

"Alkoxy" means an alkyl group attached to the parent molecular moiety through an oxygen atom. Representative alkoxy groups include methoxy, ethoxy, propoxy, butoxy, and the like.

"Alkyl" means a monovalent group derived from a straight, branched, or cyclic saturated hydrocarbon. Representative alkyl groups include methyl, ethyl, n- and iso-propyl, n-, sec-, iso- and tert-butyl, and the like.

"Aryl" means substituted and unsubstituted aromatic carbocyclic radicals and substituted and unsubstituted heterocyclic radicals having about 5 to about 14 ring atoms. Representative aryl include phenyl naphthyl, phenanthryl, anthracyl, pyridyl, furyl, pyrrolyl, quinolyl, thienyl, thiazolyl, pyrimidyl, indolyl, and the like. The aryl is optionally substituted with one or more groups selected from hydroxy, halogen, $C_1$ to $C_4$ alkyl and $C_1$ to $C_4$ alkoxy.

"Arylalkyl" means an aryl group attached to the parent molecular moiety through an alkylene group. Representative arylalkyl groups include benzyl, phenethyl, napth-1-ylmethyl, phenylpropyl, and the like.

The heterocyclic imidazoline-based quaternized compounds (sometimes referred to herein as "foamer" or "foaming agent") of this invention have been shown to be effective for penetrating subterranean oil-bearing or gas-bearing formations to recover natural gas from a gas well or recover crude oil from a gas-lifted oil well. Exemplary gas-lift methods for producing oil are disclosed in U.S. Pat. No. 5,871,048 and U.S. Patent Application No. 2004-0177968 A1. In other words, the foaming agents of the invention are effective at aiding and making more efficient removal of hydrocarbon and/or water or mixtures thereof from wells. Unlike foamers of the prior art, which typically include additional corrosion inhibitors formulated to protect downhole equipment from the corrosive wellbore environment, the foamer of this invention is effective at inhibiting corrosion by itself in the absence of other anti-corrosive agents. It should be appreciated, however, that in some embodiments other corrosion inhibitors, scale inhibitors, and/or biocides may be used in conjunction with or in formulations including the foamers of this invention.

Even though this disclosure is directed primarily to oil and gas applications, it is contemplated that the compounds of the invention may be used in a variety of applications. Representative applications include flotation deinker for paper applications to remove ink particles and other contaminants and in mining as a flotation aid to extract minerals. Foamers are generally added to fluids and mixtures to reduce surface tension. As air is blown through the fluid, for example, mineral particles or ink particles attach to the air bubbles and rise to form a froth on the fluid (usually water) surface. The froth is typically skimmed off, thus leaving a cleaned concentrate.

The imidazoline-based foamer of this invention can generate stable foams and is preferably present at a level from about 10 ppm to about 100,000 ppm actives, based on total weight of actives. Preferably, the dosage level is from about 100 ppm to about 20,000 ppm. More preferably, the dosage level is from about 200 ppm to about 10,000 ppm. Most preferably the dosage level is from about 300 ppm to about 8,000 ppm.

The preparation of imidazoline and imidazoline-based compounds is in general well known in the art. It should be appreciated that the foamers of the invention may be prepared by any suitable method. A preferred method includes reacting a di-substituted imidazoline starting material, as shown in Structure SM-1 below, with α, β unsaturated carboxylic, sulfonic, or phosphonic fatty acids, amide and ester derivatives thereof (collectively referred to herein as α, β unsaturated organic acids), and combinations thereof. The selected α, β unsaturated organic acid(s) would reside in the location described as $R_3$ herein.

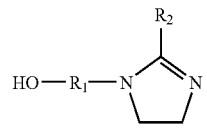

(SM-1)

In preferred embodiments, $R_1$ and $R_2$ are independently selected from substituted or unsubstituted branched, chain, or ring alkyl or alkenyl having from 1 to about 25 carbon atoms in its main chain. It should be understood that the range of carbon atoms described for $R_1$ and $R_2$ refers to the main chain of the group and does not include carbon atoms that be contributed by substituents. Examples of suitable substituents include, without limitation, hydrogen and linear or branched alkyl, aryl, alkylaryl, cycloalkyl, and heteroaromatic groups having from 1 to about 10 carbon atoms, and their combinations.

In a particularly preferred embodiment, the α, β unsaturated organic acid compound may be selected from the group consisting of substituted and unsubstituted α, β unsaturated carboxylic fatty acids and amide and ester derivatives thereof, having from about 3 to about 11 carbon atoms, or a salt thereof; substituted and unsubstituted α, β unsaturated fatty acids having from about 2 to about 11 carbon atoms, or a salt thereof and combinations thereof.

More specifically, E, β unsaturated organic acids typically have from about 2 to about 9 carbon atoms. In a more preferred embodiment, the α, β unsaturated organic acids have from about 2 to about 7 carbon atoms. The most preferred form of the α, β unsaturated organic acids of the invention have from about 2 to about 5 carbon atoms. It should be understood that the range of carbon atoms described refers to the main chain of the fatty acid and does not include carbon atoms that be contributed by substituents. Examples of suitable substituents include, without limitation, hydrogen and linear or branched alkyl, aryl, alkylaryl, cycloalkyl, and heteroaromatic groups having from 1 to about 10 carbon atoms, and their combinations.

Representative α, β unsaturated organic acids include acrylic acid, maleic anhydride, vinyl sulfonic acid, sulfonic acid, 2-methyl vinyl sulfonic acid, maleic acid, any carbon chain resulting in an $R_3$ group (as described herein) having one or more acidic functional groups selected from —$CO_2H$, —$SO_3H$, —$PO_3H_2$, —$CONH_2$, —$CO_2R_4$, —$CONHR_4$, —$CON(R_4)_2$, and combinations thereof, wherein each $R_4$ is independently selected from the group consisting of: branched or unbranched alkyl, aryl, alkylaryl, cycloalkyl, and heteroaromatic groups having from 1 to about 10 carbon atoms, and combinations thereof.

The general reaction scheme for the imidazoline-based foamers of the invention includes reacting the di-substituted imidazoline of Structure SM-1 above with the described α, β unsaturated organic acid. A representative reaction scheme is shown below and referred to as Scheme 1. In representative Scheme 1, cocoyl hydroxyethyl imidazoline is reacted with acrylic acid to form Foamer-1. In an embodiment, the imidazoline foamer is farther reacted with a caustic agent to form a salt. For example, Foamer-1 may be reacted with sodium hydroxide or triethanolamine (TEA) to form Salt-1. Representative Scheme 2 illustrates a similar reaction with cocoyl hydroxyethyl imidazoline and vinyl sulfonic acid, producing Foamer-2, which can also be further processed into salt form (not shown).

Scheme 1

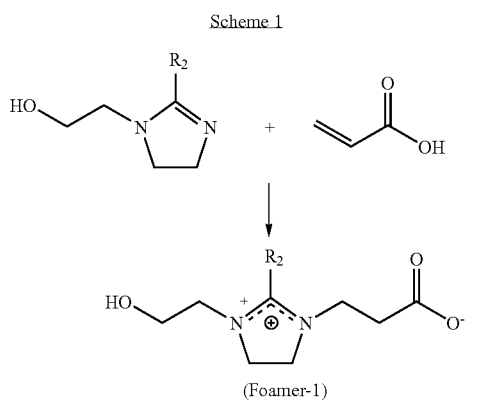

(Foamer-1)

↓ NaOH or TEA (Salt-1)

Scheme 2

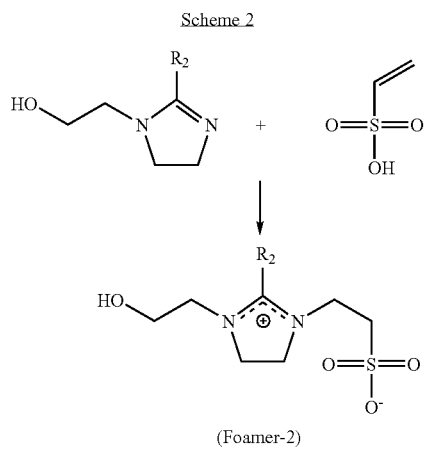

(Foamer-2)

According to alternative embodiments, $R_2$ is as defined above. In representative Schemes 1 and 2, $R_2$ is a radical derived from a fatty acid, such as coco fatty acid (i.e., coconut oil). It should be appreciated that $R_2$ may include one type or a mixture of fatty acids. In addition, $R_2$ may be derived from a single type of fatty acid, such as caprylic acid, nonanoic acid, capric acid, undecanoic acid, or lauric acid. Alternatively, the $R_2$ may be derived from a mixture of fatty acids, such as tall oil fatty acid or a mixture of other fatty acids.

Representative long chain fatty acids (i.e., R—COOH) include caprylic acid, nonanoic acid, capric acid, undecanoic acid, lauric acid, tridecanoic acid, myristic acid, palmitoleic acid, tall oil fatty acid (mixture of oleic, linoleic and linolenic acids), stearic acid, palmitic acid, arachidic acid, arachidonic acid, oleic acid, 9,11,13-octadecatrienoic acid, 5,8,11,14-eicosatetraenoic acid, eicosenoic acid, heneicosanoic acid, erucic acid, heneicosanoic acid, behenic acid, 3-methylhexadecanoic acid; 7-methylhexadecanoic acid, 13-methylhexadecanoic acid, 14-methyl-11-eicosenoic acid, derivatives thereof, the like, and mixtures thereof.

It should be appreciated that terms used herein to depict reaction steps in reaction schemes are intended to embrace all synthesis procedures, such as batch, continuous, in situ, interfacial, solution-type, and combinations thereof. Further, such terms are used for convenience and should not be construed to limit the scope of the invention to: (i) any particular sequence of reaction steps suggested herein; or (ii) the production and/or separation of any specified amount of intermediate(s) and/or starting material for any specified length of times as a prerequisite to a subsequent process step. Moreover, this disclosure should be broadly interpreted as being applicable to methods and applications both including and not including the described betaine surfactant.

In one preferred embodiment, the heterocyclic quaternary foamers of this invention are combined with a synergistically effective amount of one or more betaine surfactants. Typically, compositions having one or more heterocyclic foamers and one or more betaine surfactants include from about 5 to about 95 weight percent of the betaine surfactant. Preferably, these compositions include from about 10 to 90 weight percent of the betaine surfactant(s). More preferably, the compositions include from about 20 to about 80 weight percent of the betaine surfactant(s).

Representative betaine surfactants include alkylamidopropyl betaines, alkyl dimethyl betaines, sulfo betaines, and combinations thereof. More specifically, the betaine surfactant may include cocamidopropyl betaine, cocamidopropyl betaine, caproyloylamidopropyl betaine, caprylamidopropyl betaine, and combinations thereof. In preferred embodiments, the betaine surfactant includes one or more sulfo betaines, such as N-decyl-N,N-dimethyl-3-ammonio-1-propanesulfonate, dimethyl-(2-hydroxyethyl)-(3-sulfopropyl) ammonium, lauramidopropyl hydroxysultaine, and combinations thereof.

Foaming agents (both with and without the betaine surfactant) of this invention are typically made in a mixed solvent system that may contain water, alcohols, glycols, glycol ethers, or the like. As shown above, Michael addition is the reaction between the imidazoline-based compound and the carbonyl compound (e.g., acrylic acid and vinyl sulfonic acid). The addition of this chemical moiety to the structure of the molecule increases its water solubility, enabling it to adsorb at the air bubble interface and increasing its foamability. It is also tolerant to high salt contents.

Examples of suitable solvents for the mixed solvent system are alcohols such as methanol, ethanol, isopropanol, isobutanol, secondary butanol, glycols (e.g., ethylene glycol, ethylene glycol monobutyl ether, and the like), aliphatic and aromatic hydrocarbons, the like, and combinations thereof. In some embodiments, the described compounds are sparingly or fully water-soluble and as such compositions may be suitably formulated in a mixture of water and one or more alcohols or glycols. Similarly, the described compounds may be suitably formulated in an aromatic naptha, such as heavy aromatic naptha, by incorporating one or more alcohols or glycols in the composition.

The effective amount of active ingredient in a formulation required to sufficiently foam and/or prevent corrosion varies with the system in which it is used. Methods for monitoring foaming and/or corrosion rates in different systems are well known to those skilled in the art and may be used to decide the effective amount of active ingredient required in a particular situation. The described compounds may be used to impart the property of foaming to a composition for use in an oil or gas field application and may have one or more other functions, such as corrosion inhibition and/or scale inhibition.

In an embodiment, the composition of the invention includes from about 95 weight percent to about 5 weight percent of the foaming agent. In another embodiment, the composition includes from about 5 to about 95 weight percent of the betaine surfactant.

Representative synergistic commercial formulations include compositions having about 10 weight percent to about 90 weight percent of the described foaming agent and about 90 weight percent to about 10 weight percent of betaine surfactant(s). Specific formulations may include about 10, 40, or 80 weight percent of the described foaming agent and about 90, 60, or 20 weight percent, respectively, of the betaine surfactant(s). It should be appreciated that these are only exemplary formulations and the compositions may include further weight percentages of each component and may also include additional components/solvents as described herein.

The described compounds are particularly effective for unloading fluids (oil and/or water) from oil and gas wells under a variety of conditions. These compounds/compositions may be used in wells in which oil cuts in the field can range from about 0% (oil field) to 100% (refinery) oil, while the nature of the water can range from 0 to 300,000 ppm TDS (total dissolved solids). In addition, the bottom hole temperature can be between 60° F. and 400° F. In a preferred method, the described foamers can be applied by batch treatments or continuously via the casing/tubing annulus or via capillary strings. Batch treatment typically involves the application of a single volume of foamer to the well, where a subsequent batch is applied when the foamer begins to lose its effectiveness. In a typical continuous application, in contrast, a smaller volume is applied continuously.

The described compounds may be used alone or in combination with other compounds to further increase the effect and delivery of the products. Typical combinations include pour point depressants and/or surfactants. Examples of suitable pour point depressants are $C_1$ to $C_3$ linear or branched alcohols, ethylene, and propylene glycol. Examples of suitable surfactants are nonionic surfactants, such as alkoxylated alcohols, carboxylic acids or ethers, alkyl ethoxylates, and sorbitan derivatives; anionic surfactants, such as fatty carboxylates, alkyl phosphates, alkyl sulfonates, and alkyl sulfates; cationic surfactants, such as mono- and di-alkyl quaternary amines; amphoteric surfactants, such as alkyl betaines, alkylamido propyl betaines, alklyampho acetates, and alkylamidopropyl hydroxysultaines.

In alternative embodiments, formulations may include components such as a corrosion inhibitor and/or a scale inhibitor. Representative corrosion inhibitors include amidoamines, quaternary amines, amides, phosphate esters, other suitable corrosion inhibitors, and combinations thereof. Representative scale inhibitors include polyphosphates, polyphosphonates, other suitable scale inhibitors, and combinations thereof. The composition may also include one or more suitable solvents including, but not limited to, water, monoethylene glycol, ethylene glycol, ethylene glycol monobutyl ether, methanol, isopropanol, the like, derivatives thereof, and combinations thereof.

EXAMPLES

The foregoing may be better understood by reference to the following examples, which are intended only for illustrative purposes and are not intended to limit the scope of the invention.

Example 1

In preparing an exemplary imidazoline-based compound of the invention 59.8 grams of cocoyl hydroxyethyl imidazoline (available, for example, under the tradename Mackazoline®, from McIntyre Group, Ltd.) was placed in a 250 ml, 4-neck flask equipped with an overhead stirrer, thermocouple, addition funnel, and a Dean-Stark trap. The compound was heated to 70° C. and then 15.8 grams of acrylic acid was added dropwise with stirring. A temperature rise of 70° C. to 95° C. was observed. After this exotherm ceased, the reaction temperature was raised to about 120° C. for 2 hours and 18.9 ml of isopropanol was added. The product is identified as Product 1 in the tables below.

Example 2

An exemplary sodium salt of the imidazoline-based foamers of the invention was prepared by placing 56.2 grams of cocoyl hydroxyethyl imidazoline (as above) in a 250 ml, 4-neck flask equipped with an overhead stirrer, thermocouple, addition funnel, and a Dean-Stark trap. The compound was heated to 70° C. and then 15.8 grams of acrylic acid was added dropwise with stirring. A temperature rise of 71° C. to 99° C. was observed. After this exotherm ceased, the reaction temperature was raised to about 130° C. for 2 hours and 16 grams of 50% NaOH and 12 grams of isopropanol was added. The product is identified as Product 2 in the tables below.

20 weight percent Product 2 was combined with 70 weight percent water and 10 weight percent ethyleneglycol monobutyl ether to form Product 3, as indicated in the below tables.

Example 3

A foaming agent was added to a hydrocarbon condensate mixture (Exxsol® D40 Fluid available from Exxon Mobil Corporation in Irving, Tex.) and brine (10.2% NaCl and 3.7% $CaCl_2.2H_2O$) in the volume-to-volume ratios shown below as C/B in Tables 1 and 2. Conventional foaming agents, ether sulfate, olefin sulfonate, and capryloyl/capryl amidopropyl betaine were also tested for comparison. A dynamic foam test cell was used to measure in real-time the liquid unloading efficiency of foaming agents at temperatures up to 190° F. The test cell included a nitrogen supply; a jacketed 1,000 ml graduated cylinder with a glass frit on the bottom for gas flow; a flow meter; a temperature-controlled water bath; a container for collecting unloaded liquid; a condenser for transporting the liquid from a cylinder to another container; and a balance connected to a computer for recording real-time measurements. The gas flow rate was held constant at 15 SCFH.

The percent liquid unloading was calculated by dividing the weight of the collected liquid in the container at 15 min (i.e., the amount overflowed) by the initial weight placed in the cylinder (100 or 200 grams) times 100. The weight percent of the liquid removed (i.e., percent unloading) was then calculated from 200 grams of fluid (Table 1) or 100 grams of fluid (Tables 2 and 3). It was observed that Product 1 and Product 2 of the invention are superior to the conventional foamers in both the absence and presence of the condensate.

Tables 1 and 2 show a comparison of percent unloading for various foamers at different dosages and different ratios of condensate to brine. Table 3 shows a comparison at a single dose and ratio of condensate to brine of Products 2 and 3.

TABLE 1

| C/B | ppm, active | Olefin Sulf. | C. Betaine | Product 1 | Product 2 |
|---|---|---|---|---|---|
| 0/100 | 400 | 63.0 | 61.3 | 81.8 | 85.5 |
| 50/50 | 1,000 | 30.2 | 54.2 | 80.1 | 65.0 (200 ppm) |
| 77/23 | 4,000 | 7.2 | 62.0 | 54.5 | 75.2 |

TABLE 1-continued

| C/B | ppm, active | Olefin Sulf. | C. Betaine | Product 1 | Product 2 |
|---|---|---|---|---|---|
| 92/8 | 4,000 | — | 75 | 41.5 | 87.1 |
| 99.7/0.3 | 400 | — | — | — | 87.1 |

TABLE 2

| C/B | ppm, active | Ether sulf. | Olefin Sulf. | C. Betaine | Product 2 |
|---|---|---|---|---|---|
| 50/50 | 400 | 44.2 | 41.9 | 0.9 | 63.7 |
| 77/23 | 400 | 19.2 | 56.3 | 29.4 | 71.8 |

TABLE 3

| C/B | ppm, active | Product 2 | Product 3 |
|---|---|---|---|
| 50/50 | 400 | 63.7 | 71.0 |

Example 4

An unexpected synergistic effect was observed when a mixture of capryloyl/capryl amidopropyl betaine and Product 2 was tested. This mixture is indicated as Product 4 in Table 4 below and includes about 14.4 weight percent of the betaine and 25.3 weight percent of Product 2 in a solvent system of isopropanol and water. The weight percent of the liquid removed (i.e., percent unloading) after 15 min was calculated from 200 grams of fluid in a 1,000 ml column with nitrogen gas (15 SCFH) blown through a glass fret in the bottom of the test vessel.

TABLE 4

| C/B | ppm, active | Product 2 | C. Betaine | Product 4 |
|---|---|---|---|---|
| 14/86 | 400 | 19.7 | 57.2 | 80.4 |
| 26/74 | 400 | 35.7 | 62.8 | 83.2 |

Example 5

The performance of Product 1 as a corrosion inhibitor was evaluated with a Wheelbox Test and tested against the conventional roamer capryloyl/capryl amidopropyl betaine. This test was conducted at about 175° C. in a rotary oven using flat, rectangular 1018 carbon steel, water quenched, and hardened coupons. To prepare the coupons, metal surfaces were sand blasted, washed in an alcohol/toluene mixture and dried. They were then weighed and placed individually in sample bottles.

The test medium was brine having about 10.2% NaCl and about 3.7% $CaCl_2$. Each bottle was dosed with a measured amount of the corrosion inhibitor and coupons were placed in the bottles, which were then capped and shaken. The bottles were pressurized with $CO_2$ to 200 psi. The oven was loaded with the coupon-containing bottles that were then rotated in the oven for 24 hours. After cleaning and drying, the coupons were reweighed and the percent corrosion inhibition was calculated using the formula: $100\times(W_b-W_t)/W_b$. Where, $W_b$ is the average blank weight loss and $W_t$ is the weight loss of treated coupon.

The results are shown in Table 5. It can be seen that Product 1 of the present invention provided better corrosion protection than the conventional foamer.

TABLE 5

| Foamer | ppm, active | % Protection |
|---|---|---|
| Blank | 0 | 0 |
| C. Betaine | 2,000 | 61.9 |
| Product 1 | 2,000 | 74.3 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. An imidazoline-based foaming composition consisting of:
   (a) 25.3 weight percent of a cyclic quaternized foaming agent having a general formula:

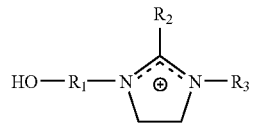

wherein
   $R_1$ is unsubstituted straight-chain alkyl having 2 carbon atoms;
   $R_2$ is selected from substituted or unsubstituted branched, chain, or ring alkyl or alkenyl having from 1 to about 25 carbon atoms in its main chain; and
   $R_3$ is —$CH_2$—$CH_2$—COOH;
   (b) 14.4 weight percent of capryloyl/capryl amidopropyl betaine surfactant; and
   (c) a mixture of isopropanol and water.

2. A method of foaming a fluid, the method comprising: adding an effective foam-forming amount of the foaming composition of claim 1 to a well as batch addition or continuously.

3. The method of claim 2, including adding said foaming composition so that from about 10 to about 100,000 ppm of actives are present in the fluid.

4. The method of claim 2, including adding said foaming composition so that from about 100 to about 20,000 ppm of actives are present in the fluid.

5. The method of claim 2, including adding said foaming composition so that from about 200 to about 10,000 ppm of actives are present in the fluid.

6. The method of claim 2, wherein the fluid is oil or gas and water.

7. A method of foaming a fluid, the method comprising: adding to the fluid an imidazoline-based foaming composition consisting of (i) 25.3 weight percent of a salt of a cyclic quaternized foaming agent, said foaming agent having a general formula:

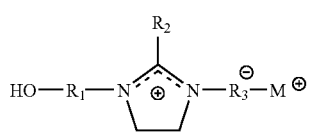

wherein
$R_1$ is unsubstituted straight-chain alkyl having 2 carbon atoms;
$R_2$ is selected from substituted or unsubstituted branched, chain, or ring alkyl or alkenyl having from 1 to about 25 carbon atoms in its main chain; and
$R_3$ is —$CH_2$—$CH_2$—$COO$—; (ii) 14.4 weight percent of capryloyl/capryl amidopropyl betaine surfactant; and (iii) a mixture of isopropanol and water; and wherein M is any counterion.

* * * * *